April 29, 1941.  A. G. BADE  2,239,983

VARIABLE SPEED TRANSMISSION

Filed Feb. 27, 1936  2 Sheets—Sheet 1

INVENTOR.
Alfred G. Bade
BY
Ralph W. Brown
ATTORNEY.

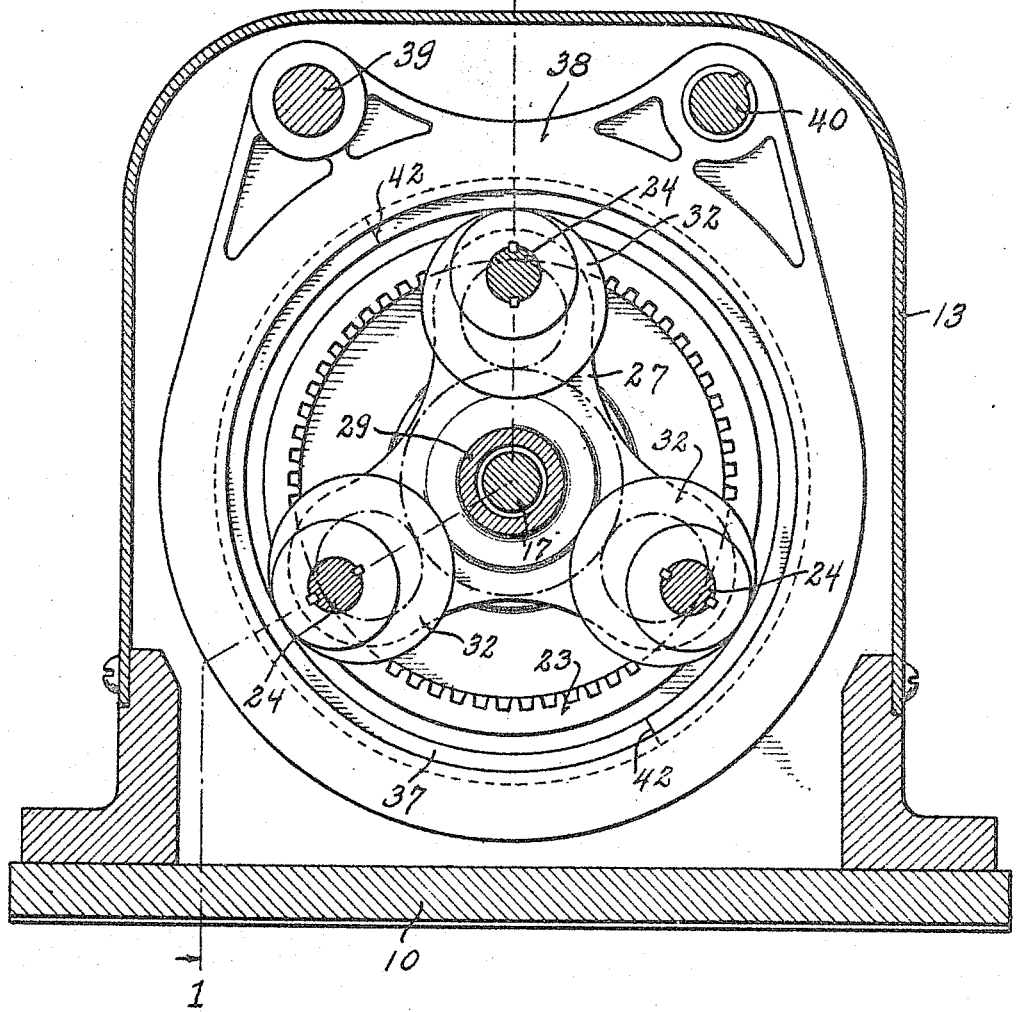

Patented Apr. 29, 1941

2,239,983

UNITED STATES PATENT OFFICE 2,239,983

VARIABLE SPEED TRANSMISSION

Alfred Gust Bade, Milwaukee, Wis., assignor to The Falk Corporation, Milwaukee, Wis., a corporation of Wisconsin Application February 27, 1936, Serial No. 66,041

14 Claims. (Cl. 74—281)

This invention relates to variable speed transmissions of the type involving a group of longitudinally tapered planetary rollers and an encircling contact ring adjustable lengthwise of the rollers to regulate their planetary action.

In transmissions of this type, the rollers are ordinarily mounted to revolve about what might be termed a main or central axis and also to rotate about their individual axes which are inclined to the main axis in such direction and to such extent that the outer extremities of the rollers are parallel to the main axis. Each roller is preferably connected to a gear coaxial therewith and forming a part of a positive torque transmitting gear train.

One object of the present invention is to provide improved means for expanding the roller group against the encircling ring so as to maintain the desired contact pressures between the rollers and ring without disturbing the axes of the individual rollers and their connected gears. This I accomplish by the use of resilient means for urging the rollers lengthwise along their outwardly inclined individual axes.

Other objects and advantages will appear, expressed or implied, from the following description of an illustrative embodiment of the present invention.

In the accompanying drawings:

Fig. 2 is a transverse sectional view taken along the line 2—2 of Fig. 1.

Figure 1:
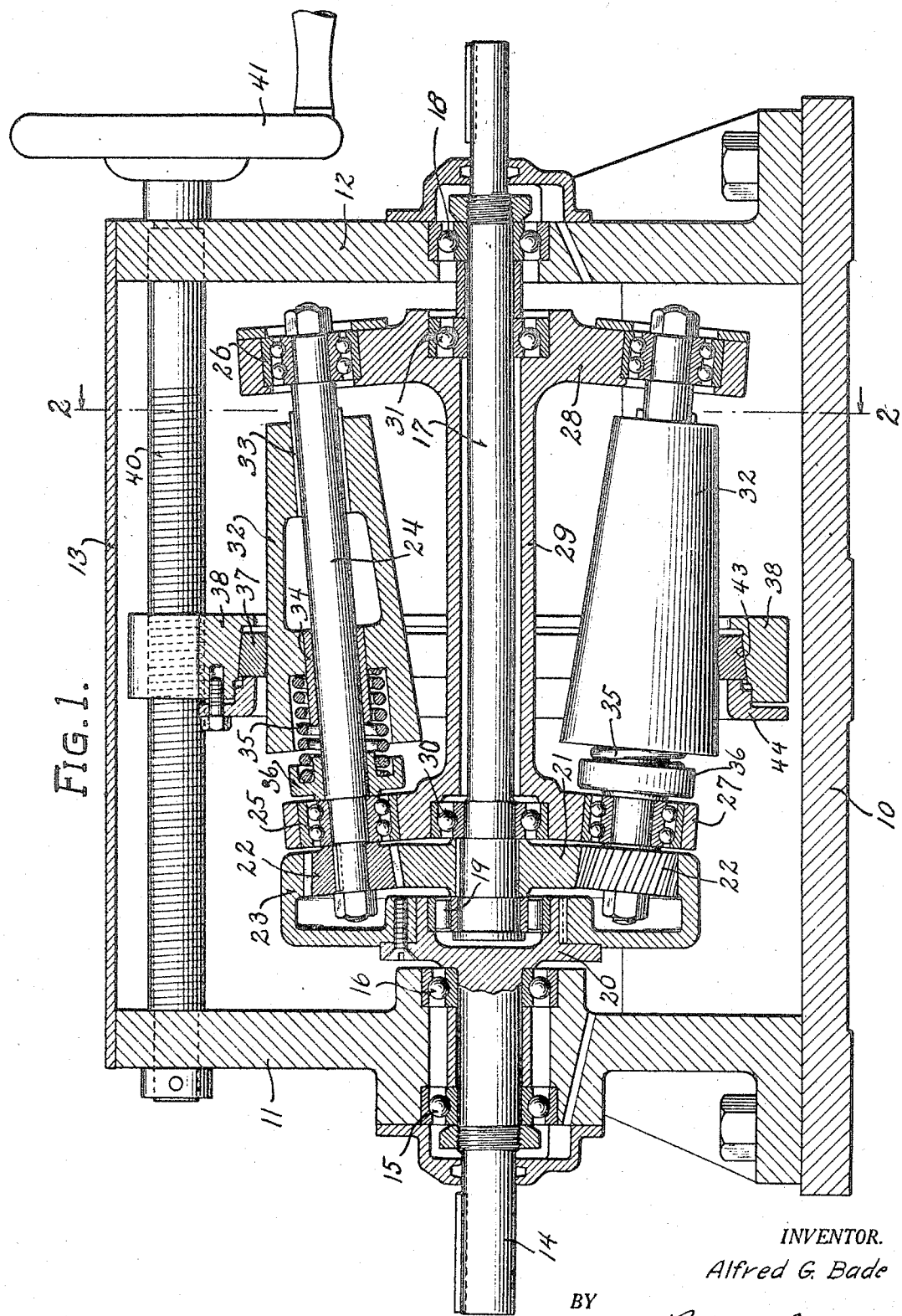
Fig. 1 is a longitudinal sectional view of a variable speed transmission constructed in accordance with the present invention, this view being taken along the line 1—1 of Fig. 2.

The transmission shown is enclosed in a housing comprising a base plate 10, end walls 11 and 12, and a removable cover 13. It includes a driven shaft 14, journalled in spaced bearings 15 and 16 in the end wall 11, and a drive shaft 17, journalled in a bearing 18 in the end wall 12 and in a bearing 19 in a hollow head 20 carried by the shaft 14. The drive shaft 17 carries a sun gear 21 which meshes with a plurality of planet gears 22 which in turn mesh with an internal orbit gear 23 fixed to the head 20 on the driven shaft.

Each of the planet gears 22 is fixed to the end of a shaft 24, journalled in bearings 25 and 26, fixed in the end spiders 27 and 28 of a rotary carrier 29, which is supported on bearings 30 and 31 on the drive shaft 17. Each shaft 24 also carries a longitudinally tapered roller 32 keyed or splined at one end 33 thereto, so as to rotate therewith and with the gear 22 and also to permit axial movement of the roller along the shaft. A bushing 34, loose on each shaft, provides additional support for the roller and also provides a center for a coiled compression spring 35 interposed between the roller and a collar 36 on the shaft.

It will be noted that each shaft 24 is inclined relative to the axis of rotation of the carrier 29, the angle of inclination being equal to the angle of taper of the roller, so that the outer extremities of the rollers 32 are parallel to the axis of rotation of the carrier. The rollers 32 are urged along their outwardly inclined supporting shafts by the springs 35 so as to expand the roller group against an encircling ring 37 without disturbing the positions of the individual roller axes. The springs 35 thus serve to maintain desired contact pressures between the rollers 32 and ring 37.

The ring 37 controls the planetary action of the rollers 32 and is adjustable lengthwise of the rollers to regulate that action. It is shown secured to and within a carrier ring 38 which is supported upon a guide rod 39 and a feed screw 40 which are arranged parallel to each other and to the axis of rotation of the rotary carrier 29. The carrier ring 38 is slidable along the rod 39 and actuated and controlled by the screw 40 which is preferably equipped with a hand wheel 41 or other appropriate means for manipulation.

In this instance the ring 37 is split, as at 42, into separable parts to facilitate removal and replacement. It is shown seated against an interior tapered face 43 of the carrier ring 38 and removably fixed in place by a clamp ring 44 bolted or otherwise fixed to the carrier ring.

Various changes may be made in the embodiment of the invention hereinabove specifically described without departing from or sacrificing the advantages of the invention as defined in the appended claims.

I claim:

1. In a variable speed transmission the combination of a carrier mounted for rotation about a fixed axis, a group of tapered planetary rollers supported therein for rotation about individual axes, said last-named axes being inclined relative to said first named axis and fixed relative to said carrier, a control ring contacting and encircling said group of rollers, means for shifting said ring axially over substantially the length of said rollers to regulate their planetary action, torque transmitting gearing including a planetary gear connected to each of said rollers, and resilient means for urging said rollers outwardly along their axes to thereby expand said roller group against said ring without disturbing the positions of said roller axes.

2. In a variable speed transmission the combination of a rotary carrier, a plurality of inclined shafts journalled for rotation in said carrier, torque transmitting gearing including a planetary gear on each of said shafts, a longitudinally tapered planetary roller connected for rotation with each of said shafts and lengthwise movable thereon, a ring encircling and contacting said rollers to control the planetary action thereof, means for shifting said ring longitudinally of said rollers to regulate their planetary action, and resilient means for urging said rollers outwardly along their shafts to effect pressure contact between said rollers and ring.

3. In a variable speed transmission the combination of a rotary carrier, a group of longitudinally tapered planetary rollers rotatable about inclined axes fixed relative to said carrier, a ring encircling and contacting said rollers to control their planetary action, means for shifting said ring axially over substantially the length of said rollers to regulate their planetary action, and separate means acting on each of said rollers to shift the same outwardly along their axes and thereby expand said group of rollers outwardly against said ring.

4. A variable speed transmission comprising a rotary carrier, a conical planetary roller supported for rotation with and with respect to the carrier and inclined with respect to the axis of rotation thereof, a non-rotatable, non-resilient member encircling said roller, means including said carrier for mounting said member and said roller for relative movement with respect to each other both axially and transversely of said axis while maintaining the inclination of the roller to said axis, means for moving said member axially over substantially the length of the roller, and means to cause said relative transverse movement whereby to bring said roller and said member into pressure contact.

5. A variable speed transmission comprising a rotary carrier, conical planetary roller means supported for rotation with and with respect to the carrier and inclined with respect to the axis of rotation thereof, non-rotatable, non-resilient means encircling said roller means, means including said carrier for mounting said encircling means and said roller means for relative movement with respect to each other both axially and transversely of said axis, means for moving said encircling means axially over substantially the length of the roller, and elastic biasing means associated with one of said aforementioned means and tending to produce said relative transverse movement whereby to bring said roller means and said encircling means into pressure contact.

6. A variable speed transmission comprising a rotary carrier, a conical planetary roller supported for rotation with and with respect to the carrier and inclined with respect to the axis of rotation thereof, a non-rotatable, non-resilient member encircling said roller, means including said carrier for mounting said member and said roller for relative movement with respect to each other both axially and transversely of said axis while maintaining the inclination of the roller to said axis, and means for moving said member axially over substantially the length of the roller, said rollers being relatively large and heavy whereby centrifugal force causes said relative transverse movement, bringing said roller and said member into pressure contact.

7. A variable speed transmission comprising a rotary carrier, a plurality of conical planetary rollers supported for rotation with and with respect to the carrier and correspondingly inclined with respect to the axis of rotation thereof, a non-rotatable, non-resilient member encircling said rollers, means interrelating said member and said rollers whereby said member may be translated axially of said rollers and whereby said member and said rollers may be relatively bodily moved transversely with respect to the axis of rotation of the carrier, means for moving said member axially over substantially the length of the rollers, and elastic biasing means incorporated in the transmission and effective to cause said rollers and said ring to partake of said relative transverse movement and thereby develop a working pressure between all of the rollers and the member.

8. A variable speed transmission comprising a rotary carrier, a plurality of conical planetary rollers supported for rotation with and with respect to the carrier and correspondingly inclined with respect to the axis of rotation thereof, a non-rotatable, non-resilient member encircling said rollers, means interrelating said member and said rollers whereby said member may be translated axially of said rollers and whereby said member and said rollers may be relatively bodily moved transversely with respect to the axis of rotation of the carrier, and means for moving said member axially over substantially the length of the rollers, said rollers being individually and independently movable transversely of said axis and being relatively large and heavy whereby centrifugal force acting thereon products said relative transverse movement.

9. A variable speed transmission comprising a rotary carrier, a conical planetary roller supported for rotation with and with respect to the carrier and inclined with respect to the axis of rotation thereof, a non-rotatable, non-contractable member encircling said roller, means including said carrier for mounting said member and said roller for relative movement with respect to each other both axially and transversely of said axis while maintaining the inclination of the roller to said axis, means for moving said member axially over substantially the length of the roller, and means to cause said relative transverse movement whereby to bring said roller and said member into pressure contact.

10. A variable speed transmission comprising a rotary carrier, conical planetary roller means supported for rotation with and with respect to the carrier and inclined with respect to the axis of rotation thereof, non-rotatable, non-contractable means encircling said roller means, means including said carrier for mounting said encircling means and said roller means for relative movement with respect to each other both axially and transversely of said axis, means for moving said encircling means axially over substantially the length of the roller, and elastic biasing means associated with one of said aforementioned means and tending to produce said relative transverse movement whereby to bring said roller means and said encircling means into pressure contact.

11. A variable speed transmission comprising a rotary carrier, a conical planetary roller supported for rotation with and with respect to the carrier and inclined with respect to the axis of rotation thereof, a non-rotatable, rigid member encircling said roller, means including said carrier for mounting said member and said roller for relative movement with respect to each other both axially and transversely of said axis while maintaining the inclination of the roller to said axis, and means for moving said member axially over substantially the length of the roller, said rollers being relatively large and heavy whereby centrifugal force causes said relative transverse movement, bringing said rollers and said member into pressure contact.

12. A variable speed transmission comprising a carrier supported for rotation about a central axis, conical planetary roller means supported for rotation with and with respect to the carrier and inclined with respect to the axis of rotation thereof, means encircling said roller means and moveable longitudinally over substantially the length thereof, and elastic biasing means associated with said roller means to force the latter toward said encircling means to develop pressure contact therebetween.

13. A variable speed transmission comprising a carrier supported for rotation about a central axis, conical planetary roller means supported for rotation with and with respect to the carrier and inclined with respect to the axis of rotation thereof, means encircling said roller means and movable longitudinally over substantially the length thereof, and elastic biasing means associated with said roller means to force the latter toward said encircling means to develop pressure contact therebetween, said roller means being relatively large and heavy whereby the influence of centrifugal force thereon supplements the action of said elastic biasing means.

14. A variable speed transmission comprising a non-rotating non-contractable ring, a planetary roller centrifugally urged toward said ring and having a substantially conical surface for contact with said ring, means mounting said roller and ring for movement relative to each other both axially and transversely of the axis of said ring, means for effecting said relative transverse movement to additionally urge said roller toward said ring and thereby establish a working pressure between said surface and said ring, and means for effecting said relative axial movement over substantially the extent of said surface to thereby vary the speed ratio of the transmission.

ALFRED GUST BADE.